(12) United States Patent
Kelley et al.

(10) Patent No.: US 6,754,900 B1
(45) Date of Patent: Jun. 22, 2004

(54) SYSTEM FOR PROVIDING WEB BROWSER ACCESS TO AN OPERATING SYSTEM DESKTOP

(75) Inventors: Edward E. Kelley, Wappingers Falls, NY (US); Norman J. Dauerer, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 959 days.

(21) Appl. No.: 08/977,519

(22) Filed: Nov. 24, 1997

(51) Int. Cl.⁷ .............................. G06F 9/00; G06F 9/44
(52) U.S. Cl. ...................... 719/319; 717/105; 717/109; 715/501.1; 715/513
(58) Field of Search ........................ 709/300, 310–332; 345/348, 335, 760, 764, 765; 717/105, 109

(56) References Cited

U.S. PATENT DOCUMENTS

| | | | | |
|---|---|---|---|---|
| 5,737,619 A | * | 4/1998 | Judson | 715/500 |
| 5,761,673 A | * | 6/1998 | Bookman et al. | 719/311 |
| 5,877,767 A | * | 3/1999 | Yohanan | 345/738 |
| 5,893,127 A | * | 4/1999 | Tyan et al. | 715/513 |
| 5,905,492 A | * | 5/1999 | Straub et al. | 345/744 |
| 6,061,695 A | * | 5/2000 | Slivka et al. | 715/513 |

OTHER PUBLICATIONS

Microsoft Online "Web View: A New Look for Microsoft Internet Explorer 4.0 Folders", Sep. 1997.*
Microsoft Online. "The Active Desktop for Internet Explorer 4.0", Sep. 1997.*
Microsoft Online. "Web View: A New Look for Microsoft Internet Explorer 4.0 folders", Sep. 1997.*
Microsoft Online. "Microsoft Internet Explorer 4.0 White Paper", Jul. 1997.*

* cited by examiner

Primary Examiner—Lewis A. Bullock, Jr.
(74) Attorney, Agent, or Firm—DeLio & Peterson; Peter W. Peterson; Margaret A. Pepper

(57) ABSTRACT

A system, operable on a plurality of different computer operating systems, for providing web browser access to the operating system desktop having icons displayed on a screen thereof, wherein the desktop icons provide links to executable programs of and information displayable by the operating system. The process comprises first determining, for each icon to be accessed, an executable program linked to the icon, a data file used by the program, and the location of the program and data file. Then the process comprises constructing a web page of the accessed icons and linked programs and data file by assigning a HTML tag to the program and data file of each icon. The HTML tag may include an optional parameter for use by the executable program. The web page is viewable on a web browser such that the HTML tags are displayed on the web page and executable by the web browser to execute the programs on the operating system. The process includes the step of periodically repeating the steps to update the web page by determining any additional icons to be accessed and assigning a HTML tag to the program and data file of each additional icon.

20 Claims, 3 Drawing Sheets

SYSTEM FOR PROVIDING WEB BROWSER ACCESS TO AN OPERATING SYSTEM DESKTOP

BACKGROUND OF THE INVENTION

1. Field of the Invention

The present invention relates to computer programs and in particular to software for providing web browser access to a computer operating system desktop having icons displayed on a screen thereof.

2. Description of Related Art

Current web browsers have limited accesses to desktops. The best that can be done is to provide an index to the hard drives and allow viewing of the various files on the drive. The folders cannot be viewed nor the programs executed that exist within the folders.

In order to access operating system (OS) files, one has to know the file path and explicitly open the uniform resource locator (URL) address of file. Since such OS files do not contain HyperText Markup Language (HTML) tags indicating in code how part of the web page should be displayed, it would not be displayed correctly. While it would be possible for a computer client user to manually look up all of the paths and build a web page of all the files, it would be tedious and there would still be the problem of displaying the data without the proper HTML tags. Moreover, the web page would become out-of-date with any additions or deletions of the OS files.

There is also no easy way to invoke an OS executable application via a web browser. There is currently no way of automatically building a list of folders or executable desktop functions, selecting one of them, executing it with the correct parameters then displaying the application as a window within the web browser screen. Also, any stand alone executables found on the hard drives may not be executed directly from the existing-web browser index.

Bearing in mind the problems and deficiencies of the prior art, it is therefore an object of the present invention to provide a process and system for providing web browser access to a computer operating system desktop having icons displayed on a screen thereof.

It is another object of the present invention to provide such desktop access where the desktop icons provide links to executable OS programs of and information displayable by said operating system.

A further object of the invention is to provide desktop access via a web browser wherein optional parameters may be incorporated into the browser execution of such OS programs.

It is yet another object of the present invention to provide such desktop access which may be used with any operating system.

Still other objects and advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, a process, operable on a plurality of different computer operating systems, for providing web browser access to the operating system desktop having icons displayed on a screen thereof, wherein the desktop icons provide links to executable programs of and information displayable by the operating system. The process comprises first determining, for each icon to be accessed, an executable program linked to the icon, a data file used by the program, and the location of the program and data file. Then the process comprises constructing a web page of the accessed icons and linked programs and data file by assigning a HTML tag to the program and data file of each icon. The HTML tag may include an optional parameter for use by the executable program. The web page is viewable on a web browser such that the HTML tags are displayed on the web page and executable by the web browser to execute the programs on the operating system.

Preferably, the process includes the step of periodically repeating the steps to update the web page by determining any additional icons to be accessed and assigning a HTML tag to the program and data file of each additional icon.

The operating system desktop may contain a plurality of viewable icons, such that all of the icons and linked programs and data files are displayed by the HTML tags on the web page.

In some instances, the computer operating system desktop icons are linked to folders, which folders are linked to an executable program and a data file used by the program. The process then includes the step of constructing a web page of the accessed folders and linked programs and data file by assigning a HTML tag to the program and data file of each folder. The web page is viewable on a web browser such that the HTML tags are displayed on the web page and executable by the web browser to execute the programs on the operating system.

There may be included on the desktop one or more sub-folders, each of which is linked to an executable program and a data file used by the program. The process then includes the step of constructing one or more sub-folder web pages of the sub-folders and linked programs and data files by assigning a HTML tag to the program and data file of each sub-folder. The sub-folder web pages are viewable on a web browser such that the HTML tags are displayed on the sub-folder web pages and executable by the web browser to execute the programs on the operating system.

In another aspect, the present invention provides a program storage device readable by a machine, tangibly embodying a program of instructions executable by the machine to perform the aforementioned process for providing web browser access to a computer operating system desktop having icons displayed on a screen thereof, wherein the desktop icons provide links to executable programs of and information displayable by the operating system.

In a further aspect, the present invention provides a system for providing web browser access to a computer operating system desktop having icons displayed on a screen thereof, wherein the desktop icons provide links to executable programs of and information displayable by the operating system. The system comprises means for determining, for each icon to be accessed, an executable program linked to the icon, a data file used by the program, and the location of the program and data file. There is then provided means for constructing a web page of the accessed icons and linked programs and data file by assigning a HTML tag to the program and data file of each icon. The web page is viewable on a web browser such that the HTML tags are displayed on the web page and executable by the web browser to execute the programs on the operating system.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT (S)

Figure 1:
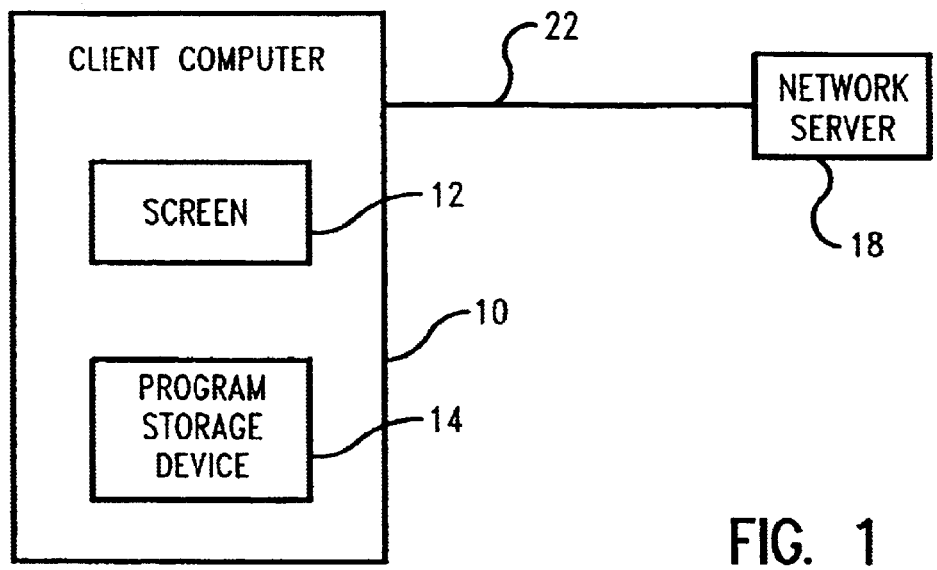
FIG. 1 is a schematic of the system of the present invention for providing web browser access to a computer operating system desktop having icons displayed on a screen thereof.

In describing the preferred embodiment of the present invention, reference will be made herein to FIGS. 1–4 of the drawings in which like numerals refer to like features of the invention. Features of the invention are not necessarily shown to scale in the drawings.

The present invention provides a process and system that allows a computer user to view and execute operating system files directly from the desktop, without having to change the way the files are viewed or executed. The present invention also automatically configures the desktop operating system to be accessible and executable from the web browser to enable all desktop applications to be executed in native mode and have all files accessed via the desktop.

Initially, the invention searches all of the operating system folders and files for OS executable functions and non-executable ASCII files and then build a series of web pages to display the data. The invention builds a web page of folders for each folder found on the desktop. It also builds web pages for all of the sub folders found within the main folders and provides links from the main folder web page to the sub folder web pages. Each web folder and sub folder is executable directly from the web page or sub folder web page.

Any non-executable files are dynamically renamed and provided with appropriate HTML tags inserted to display the files correctly. The web browser is also able to recognize and execute native OS system files from the web page.

Additionally an index to the directories is built to recognize executables from files that are to be viewed and provides a mechanism to execute the executables directly from the index to the directories.

A typical client/network system is illustrated in FIG. 1. Client computer 10 is normally linked by telephone or other network cable 22 to a network server computer 18. Such server or database may be on the Internet or on an intranet system. Client computer 10 has a microprocessor for executing stored programs by the operating system or by a web browser and includes a program storage 14 device for storage of such executable programs and data files used by such programs at specific locations therein. Preferably program storage device 14 is physically present in the client computer, but it may be located elsewhere, so long as the client computer has access to the information therein. A screen 12 is able to display the created web pages of files accessed from the program storage device.

The computer program or software incorporating the process steps and instructions described further below may be stored in the client computer's otherwise conventional program storage device, such as a semiconductor chip, a read-only memory, or magnetic media such as a diskette or computer hard drive, which is readable and executable by a computer in conjunction with a web browser such as Netscape Navigator.

Definitions relevant to the present invention are as follows:

HTML Hypertext Markup Language.

HTML tag HTML markup tags containing coded commands used to indicate how part of the web page should be displayed.

HTML source file File with the HTML tags to be converted by a web browser to be displayed on a monitor.

OS Table Operating system table. This is a table that contains the name of the operating system, the location of the folders and sub folders and the name of the program that is used to read the folders.

Figure 2:
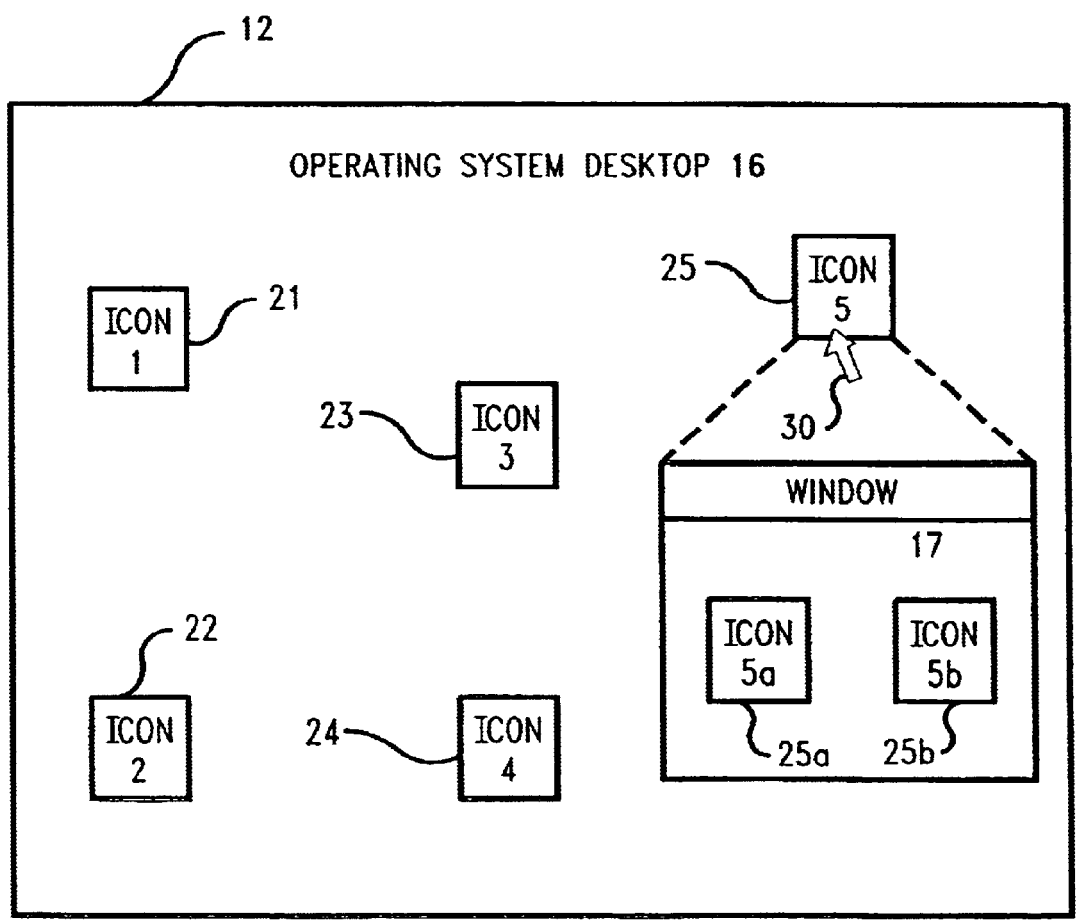
FIG. 2 is a view of a computer screen having icons displayed on a computer operating system desktop and a window.

FIG. 2 shows a computer screen 12 having icons 21, 22, 23, 24 and 25 displayed on a computer operating system desktop 16. Icons 21–24 may be directly linked to executable programs and data files of the operating system, or to folders containing one or more of such executable programs and data files. Icon 25 is shown as being linked to a folder which is shown displayed, by clicking cursor 30, as a window 17 within OS desktop 16. Icons 25a, 25b may be directly linked to executable programs and data files of the operating system, or to sub-folders containing one or more of such executable programs and data files.

Unique HTML tags are assigned to the program and data file of each icon. A web page is viewable on a web browser to display the HTML tags.

An example of an HTML folder tag used to execute programs and display data files of the operating system is shown below in Table 1:

<pgmexe>pgm=aaaaa options=abc path=aa/bb/cc
</pgmexe>                                            TABLE 1

The term <PGMEXE> indicates to the web browser that the following information will be used to execute the HTML reference. The name of the program that will be executed is pgm=aaaaa. A,B and C in the term options=a b c are the optional parameters that will be passed to the program aaaaa for execution. The name of the path to the data file is indicated as path=aa/bb/cc. The term </pgmexe> indicates the end of the information needed to execute the folder from the desktop.

Figure 3:
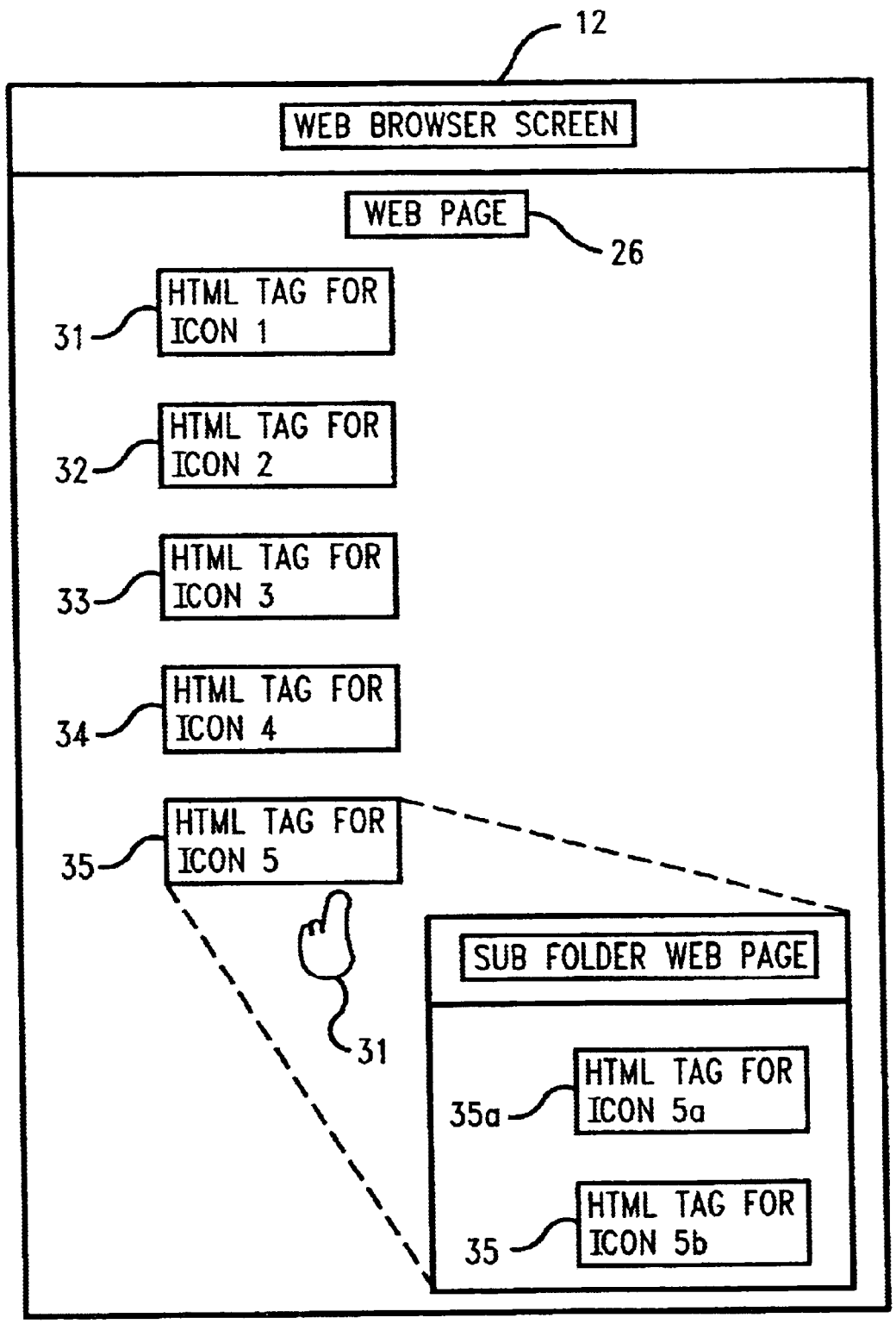
FIG. 3 is a view of a web browser web page and sub-folder web page having HTML tags corresponding to the icons displayed on the computer operating system desktop and window shown in FIG. 2.

FIG. 3 is a view of a web browser web page and sub-folder web page having HTML tags corresponding to the icons displayed on the computer operating system desktop and window shown in FIG. 2. HTML tags 31, 32, 33, 34 and 35 displayed on web page 26 correspond respectively to OS icons 21, 22, 23, 24 and 25. HTML tags 31–34 may be used to launch the executable programs and data files of the operating system, or folders containing one or more of such executable programs and data files, on the operating system. HTML tag 35 is shown as being linked to a sub-folder web page 27. HTML tags 25a, 25b may be directly linked to executable programs and data files of the operating system, or to sub-folders containing one or more of such executable programs and data files.

Figure 4:
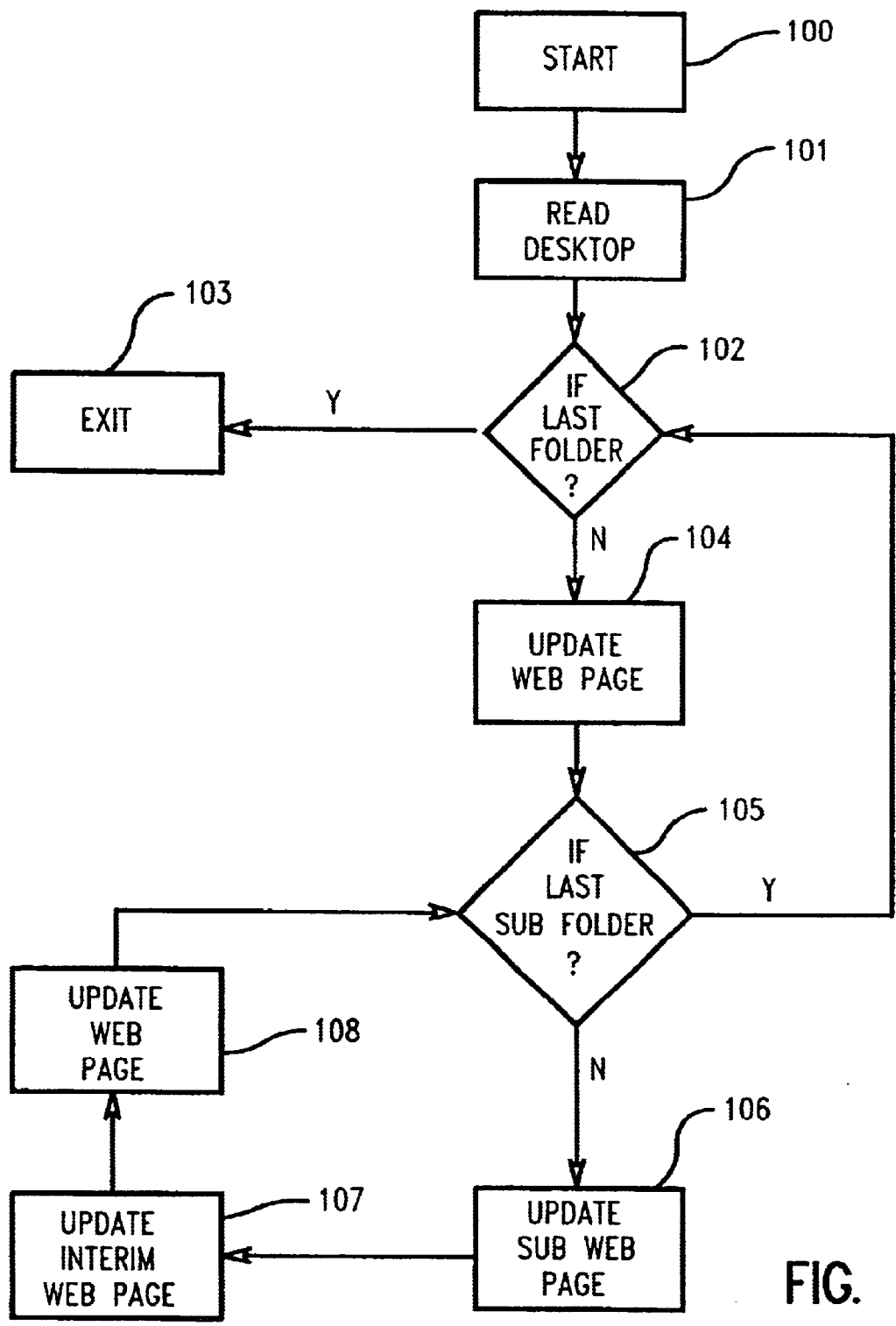
FIG. 4 is a block diagram flow chart of the preferred steps employed in practicing the present invention, wherein circled numerals indicate links between the steps.

A flow chart of the process used in the present invention is shown in FIG. 4. Numerals in circles indicate connections to and from other parts of the flow chart.

100 Start.
105 Determine the OS. Determine what operating system is being used on the workstation.
110 Is OS on the OS table? Is the operating system listed in the OS table?
115 Add OS to OS table? Do we want to add the operating system to the OS table?
120 Add OS to OS table. Add the operating system to the OS table.
125 Read the desktop. Operating systems that display icons of the screen, generally refer to the screen and the icons as the desktop. The desktop icons point to folders that contain the information necessary to execute a program or display information. Sometimes the information displayed is a collection of folders which in this description, will be called sub folders. The folders and sub folders and the information contained therein is stored in a file or files. Read the desktop means to gather the information stored in the file and or files. This information is the name of the program to execute the path to the program, any optional parameters needed by the program and the name of the data file that the program will use to execute.
130 If last folder? This means that after gathering the information from a folder, a check if made to see if the folder is the last folder.
135 Exit. Exit the program.
145 Update the web page. A web page is constructed that consists of all of the folders that are on the desktop. The web page contains the information found in the folders formatted with HTML tags that allow the browser to execute or display the programs of data that would be executed by the operating system when an icon is selected from the desktop. The new HTML tags are found in Table 1.
150 If last sub folder? This means that after gathering the information from a sub folder, a check is made to see if the sub folder is the last sub folder.
155 Update the sub web page. A web page is constructed that consists of all of the sub folders of the folders that are on the desktop. The sub web page contains the information found in the sub folders formatted with HTML tags that allow the browser to execute or display the programs of data that would be executed by the operating system when an icon is selected from the desktop. The new HTML tags are found in Table 1.
160 Update interim web page. If a folder consists of a collection of sub folders then an interim web page is constructed which is a menu of all of the sub folders.
165 Update web page. If an interim web page has been created then the web page must be changed to indicate the interim web page which is the collection of sub web pages.

Thus, the present invention provides a process and system for providing web browser access to a computer operating system desktop having icons displayed on a screen thereof, where the desktop icons providing links to executable OS programs of and information displayable by said operating system. Optional parameters may be incorporated into the browser execution of such OS programs and such desktop access may be used with any operating system.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A process for providing web browser access to a computer operating system desktop having icons displayed on a screen thereof, said process comprising:

a) providing on a client computer a computer operating system having an icon to be accessed displayed on a screen, the icon providing links to an executable program of and information displayable by said operating system on the client computer;

b) providing a web browser on the client computer operable by said computer operating system and displayable on said screen;

c) determining, for the operating system icon to be accessed, an executable program linked to said icon, a data file used by said program, and the location of said program and data file;

d) assigning a HTML tag to the program and data file of said operating system icon to be accessed; and e) constructing a web page, viewable on said web browser, of the accessed icon and linked program and data file such that the HTML tag is displayed on said web page and executable by said web browser to execute said program on said operating system.

2. The process of claim 1 including the step of periodically updating said web page by determining any additional icons to be accessed and assigning a HTML tag to the program and data file of each additional icon.

3. The process of claim 1 wherein said operating system desktop contains a plurality of viewable icons, and wherein all of said icons and linked programs and data files are displayed by the HTML tags on said web page.

4. The process of claim 1 wherein said HTML tag assigned to the program and data file includes an optional parameter for use by said executable program.

5. The process of claim 1 wherein said computer operating system desktop icons are linked to folders, which folders are linked to an executable program and a data file used by said program, and including the step of constructing a web page of the accessed folders and linked programs and data file by assigning a HTML tag to the program and data file of each folder, said web page being viewable on a web browser such that said HTML tag is displayed on said web page and executable by said web browser to execute said programs on said operating system.

6. The process of claim 5 wherein at least one of said folders is linked to a sub-folder which is linked to an executable program and a data file used by said program, and including the step of constructing a sub-folder web page of the sub-folder and linked program and data file by assigning a HTML tag to the program and data file of each sub-folder, said sub-folder web page being viewable on a web browser such that said HTML tags are displayed on said sub-folder web page and executable by said web browser to execute said programs on said operating system.

7. The process of claim 6 including a plurality of sub-folders, each of which is linked to an executable program and a data file used by said program, and including the step of constructing a plurality of sub-folder web pages of the sub-folders and linked programs and data files by assigning a HTML tag to the program and data file of each sub-folder, said sub-folder web pages being viewable on a web browser such that said HTML tag is displayed on said sub-folder web pages and executable by said web browser to execute said programs on said operating system.

8. The process of claim 1 wherein said process is operable on a plurality of different operating systems.

9. The process of claim 1 wherein said steps (c), (d) and (e) are repeated to update said web page.

10. A process for providing web browser access to a computer operating system desktop on a client computer having a plurality of icons displayed on a screen thereof, at least one of the desktop icons providing a direct link to an executable program of and information displayable by said operating system, and at least one of the desktop icons providing a link to a folder having links to a plurality of executable programs of and information displayable by said operating system, said process comprising:
   a) determining, for each icon to be accessed which has a direct link to an executable program, the executable program linked to said icon, a data file used by said program, and the location of said program and data file;
   b) determining, for each icon to be accessed which has a link to a folder having links to executable programs, the executable program linked to said icon, a data file used by said program, and the location of said program and data file;
   c) assigning a HTML tag to the program and data file of each directly linked icon and folder to be accessed;
   d) constructing a web page containing the HTML tag for the program and data file of each directly linked icon and folder to be accessed, said web page being viewable on a web browser on the client computer such that said HTML tag s displayed on said web page and executable by said web browser to execute said programs on said operating system; and
   e) periodically updating said web page by determining any additional icons to be accessed and assigning a HTML tag to the program and data file of each additional icon.

11. The process of claim 10 wherein said operating system desktop contains a plurality of viewable icons, and wherein all of said icons and linked programs and data files are displayed by HTML tags on said web page.

12. The process of claim 10 wherein said HTML tag assigned to the program and data file includes an optional parameter for use by said executable program.

13. The process of claim 10 wherein at least one of said folders is linked to a sub-folder which is linked to an executable program and a data file used by said program, and including the step of constructing a sub-folder web page of the sub-folder and linked program and data file by assigning a HTML tag to the program and data file of each sub-folder, said sub-folder web page being viewable on a web browser such that said HTML tag is displayed on said sub-folder web page and executable by said web browser to execute said programs on said operating system.

14. The process of claim 13 including a plurality of sub-folders, each of which is linked to an executable program and a data file used by said program, and including the step of constructing a plurality of sub-folder web pages of the sub-folders and linked programs and data files by assigning a HTML tag to the program and data file of each sub-folder, said sub-folder web pages being viewable on a web browser such that the HTML tags are displayed on said sub-folder web pages and executable by said web browser to execute said programs on said operating system.

15. The process of claim 10 wherein said process is operable on a plurality of different operating systems.

16. The process of claim 10 wherein said steps (c), (d) and (e) are repeated to update said web page.

17. A program storage device readable by a machine, tangibly embodying a program of instructions executable by the machine to perform a process for providing web browser access to a computer operating system desktop on a client computer having icons displayed on a screen thereof, the desktop icons providing links to executable programs of and information displayable by said operating system, said process comprising:
   a) determining, for each icon to be accessed, an executable program linked to said icon, a data file used by said program, and the location of said program and data file; and
   b) constructing a web page of the accessed icons and linked programs and data file by assigning a HTML tag to the program and data file of each icon, said web page being viewable on a web browser on the client computer such that said HTML tag is displayed on said web page and executable by said web browser to execute said programs on said operating system.

18. The program storage device of claim 17 including in said method the step of periodically updating said web page by determining any additional icons to be accessed and assigning a HTML tag to the program and data file of each additional icon.

19. A system for providing web browser access to a computer operating system desktop on a client computer having icons displayed on a screen thereof, the desktop icons providing links to executable programs of and information displayable by said operating system, said system comprising:
   means for determining, for each icon to be accessed, an executable program linked to said icon, a data file used by said program, and the location of said program and data file; and
   means for constructing a web page of the accessed icons and linked programs and data file by assigning a HTML tag to the program and data file of each icon, said web page being viewable on a web browser on the client computer such that said HTML tag is displayed on said web page and executable by said web browser to execute said programs on said operating system.

20. The system of claim 19 including means for periodically updating said web page by determining any additional icons to be accessed and assigning a HTML tag to the program and data file of each additional icon.

* * * * *